May 18, 1926.

E. ROUČKA

BALANCED SYSTEM OF CONTROL

Filed July 17, 1922 2 Sheets-Sheet 1

1,585,170

INVENTOR:
Erich Roučka,
BY
Everett Rook,
ATTORNEYS.

May 18, 1926. 1,585,170
E. ROUČKA
BALANCED SYSTEM OF CONTROL
Filed July 17, 1922 2 Sheets-Sheet 2

INVENTOR:
Erich Roučka,
BY
Everett & Rook,
ATTORNEYS.

Patented May 18, 1926.

1,585,170

UNITED STATES PATENT OFFICE.

ERICH ROUČKA, OF BLANSKO, CZECHOSLOVAKIA.

BALANCED SYSTEM OF CONTROL.

Application filed July 17, 1922. Serial No. 575,744.

One object of the invention is to provide a novel and improved system for automatically controlling or varying any physical or chemical quantity, quality, or condition such as pressure, force, position of a movable member, speed, intensity of flow, effect, momentum, temperature heat contained in gases or fluids, efficiency, electrical and magnetic quantities, intensity of combustion, oxidation, reduction, composition of fluids, etc., in accordance with another quantity or condition through the medium of a variable fluid condition, such as fluid pressure, pressure difference, flow of fluid, vibrations of fluid, etc.

Further objects are to provide a system of this character whereby a plurality of quantities or qualities may be controlled or varied in accordance with one variable fluid condition, and whereby one quantity or quality can be controlled or varied in accordance with a plurality of variable fluid conditions.

Other objects of the invention are to provide in such a system means for reducing friction between the relatively movable slidably cooperating parts to increase sensitivity of the system; to provide a motor and control mechanism whereby a physical or chemical quantity or quality of large power can be controlled by a fluid condition of comparatively small power or energy; to provide means for preventing overthrowing or hunting in the system, and to obtain other results and advantages as may be brought out by the following description.

Referring to the accompanying drawings, in which like numerals of reference indicate the same parts throughout the several views, Figure 1 is a diagrammatic illustration of a system embodying my invention;

Figure 2:
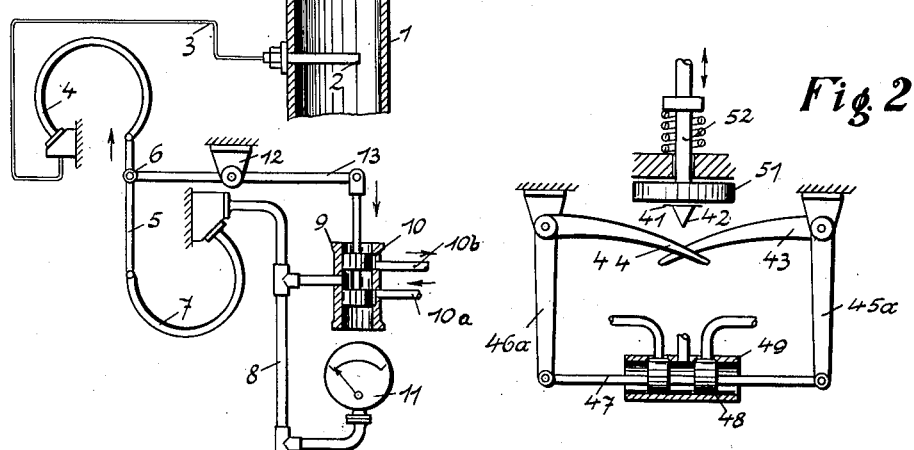
Figure 2 is a diagrammatic sectional view taken on the line II—II of Fig. 1.
Figure 1:
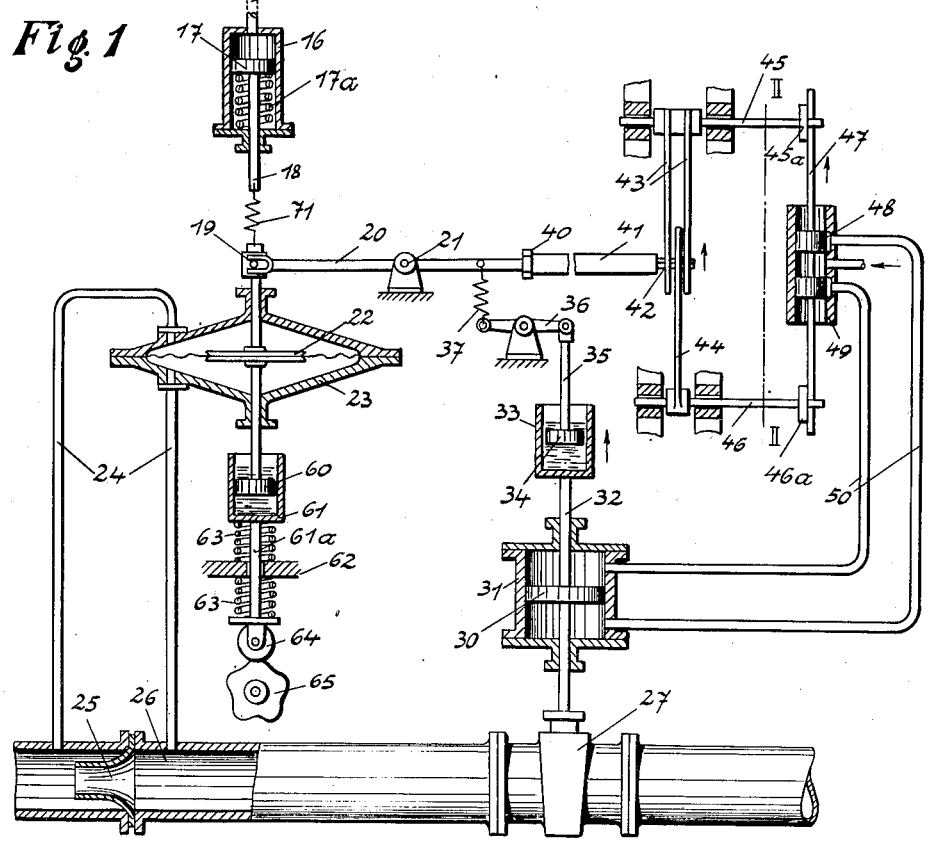

In Figures 1 and 2 is shown a system for controlling or varying a physical or chemical quantity in accordance with another or auxiliary physical or chemical quantity, not a fluid condition, by the transmission of variations in the said auxiliary quantity or quality to a variable fluid condition. The auxiliary quantity or quality is the temperature within a tube 1. A device 2 containing expansive fluid sensitive to variations in the temperature is mounted in the tube 1, the expansive fluid being conducted by a tube 3 to one end of a Bourdon tube 4. The other end of the Bourdon tube is connected by a link 5 to one end of a second Bourdon tube 7 which is sensitive to variations in a fluid condition flowing through a governor valve comprising the cylinder 9 and piston 10 to a pipe 8, one end of which is connected to the end of the Bourdon tube 7 opposite the link 5. The other end of the pipe 8 is connected through a remote pipe connection 15 to the cylinder 16 of another device sensitive to the variable fluid condition which has a piston 17 reciprocable therein. The piston 10 of the governor valve is connected to one end of a lever 13 pivotally mounted intermediate its ends at 12 to a fixed support and pivotally connected at its other end to the link 5 as at 6. The variable fluid condition in the present instance is fluid pressure flowing through pipes 10$^a$ and 10$^b$, the governor valve and pipe 8 to the Bourdon tube 7. Upon variations in the temperature in the tube 1, the expansive fluid in the tube 3 and Bourdon tube 4 is influenced so as to actuate the Bourdon tube and oscillate the lever 6 so as to move the valve piston 10 to admit fluid to or from the Bourdon tube 7. The fluid in the said Bourdon tube actuates the same so as to cooperate with the Bourdon tube 4 to balance the same and return the piston 10 to its neutral position.

The physical or chemical quantity or quality to be varied or controlled in accordance with the variations in the fluid condition in the pipe 8, is, in the present instance, fluid which flows through a conduit 26 having a valve or the like 27 to control the flow of fluid through said pipe, and a flow resistance device 25. Pipes 24 are connected to the conduit 26 at opposite sides of the flow resistance device 25 and to a diaphragm chamber 23 at opposite sides of a diaphragm 22, so that the said diaphragm is sensitive to variations or differences in pressure of the fluid at opposite sides of the resistance device 25. The diaphragm is provided with a rod, one end of which is connected by a yieldable member such as the spring 71 to the end of the piston rod 18 of the piston 17. The pressure acting on the piston 17 and the difference in pressure at opposite sides of the diaphragm 22 thus normally balance each other. The said diaphragm rod has also a pin and slot connection at 19 with one end of a lever 20 pivotally mounted intermediate its ends at 21 to a fixed support and having at its other end a flexible strip 51 carrying a wedge-shaped member 42.

As the fluid condition in the pipe 8 varies upon variation in the temperature in the tube 1, the piston 17 is actuated. An increase in pressure in the pipe 8 will force the piston 17 against the action of a spring 17ª, and a decrease in pressure in the pipe 8 will permit the piston 17 to be moved in the opposite direction by the spring 17ª. These movements of the piston 17 are transmitted through the spring 71 to the diaphragm 22, whereby balance of the device 16, 17 and the diaphragm 22 is disturbed and the motion of the diaphragm causes oscillations of the lever 20. The said lever is thus responsive to departures from balance in the system caused by variations in the fluid condition in pipe 8.

The member 42 is adapted to cooperate with levers 43 and 44 having one end in overlapping relation, as shown in Figure 2, and their other ends mounted on the respective shafts 45 and 46 revoluble in suitable fixed supports. The shafts 45 and 46 are connected by arms 45ª and 46ª to opposite ends of the piston rod 47 of the piston 48 mounted in the cylinder 49 of a governor valve which controls the flow of fluid through pipes 50 to and from a fluid motor including the piston 30 and cylinder 31 for actuating the valve 27. The member 42 is adapted to be actuated against levers 43 and 44 by auxiliary or external power, such means being shown in the present instance as comprising a block 51 mounted on a rod 52 slidable through a fixed support and adapted to be connected to the source of power for reciprocation as indicated by the arrows.

When the system is in balanced condition, the member 42 is positioned substantially equidistantly from the free ends of the levers 43 and 44 so that when the said member is actuated against said levers it engages the same simultaneously. Pulls of equal force are thus exerted upon the piston rod 47 in opposite directions, and the piston 48 remains stationary in its neutral position. When the lever 20 is oscillated upon departures from balance between the forces acting on the piston 17 and on the diaphragm 22, for instance when the temperature in tube 1 varies, the member 42 is moved in one direction or the other so that when actuated by the member 51 it engages one of the levers 43 or 44 in advance of the other. The piston 48 is thus moved in one direction and admits fluid through pipes 50 to one side of the piston 30 and from the other side thereof. The piston 30 is thus moved and opens or closes the valve 27 to vary the flow of fluid through the conduit 26. A difference in pressure of the fluid at opposite sides of the resistance device 25 is thus produced and acts upon the diaphragm 22 in a direction opposite that of the movement of the piston 17 so as to restore balance in the system. The yieldable member 71 permits movement of the diaphragm 22 independently of the piston 17, and also absorbs a part of the comparatively greater power actuating the diaphragm.

The piston rod 32 of the piston 30 carries a cylinder or dash pot 33 containing fluid and having a piston 34 mounted therein, said piston being connected by its rod 35 to one end of a lever 36 pivotally mounted intermediate its ends to a fixed support and having its other end connected by a yieldable member such as the spring 37 to the lever 20 at the side of its pivot opposite the connection with the diaphragm rod. This construction serves to prevent overthrowing or hunting in the system during the controlling movements, the piston rod 32 and dash-pot causing the lever 36 to be oscillated so as to tend to return the lever 20 to its neutral position.

For the purpose of increasing the sensitivity in the system means is provided to reduce the friction between the relatively movable slidably cooperating parts. Such means may comprise a dash-pot or cylinder 61 containing fluid and mounted on one end of a rod 61ª between opposite ends of which and a fixed support 62 are arranged compression springs 63. The rod of the diaphragm 22 has a piston 60 thereon arranged in said cylinder 61. The end of the rod 61ª opposite the cylinder 61 is provided with a roller 64 which constantly engages a rotatable cam 65. It will be obvious that rotation of the cam will cause rapid vibrations or longitudinal movements of the rod 61ª, which vibrations will be transmitted through the fluid in the dash-pot 61 to the rod of the diaphragm 22, thence through the lever 20 and levers 43 and 44 to the piston 48 of the governor valve. The rotation of the cam 65 may be constant or take place only during the controlling movements of the system. The vibrations or slight relative movement of the slidably cooperating parts reduces the friction therebetween, so as to render said parts extremely sensitive and capable of quick response to the controlling movement.

Figure 3:
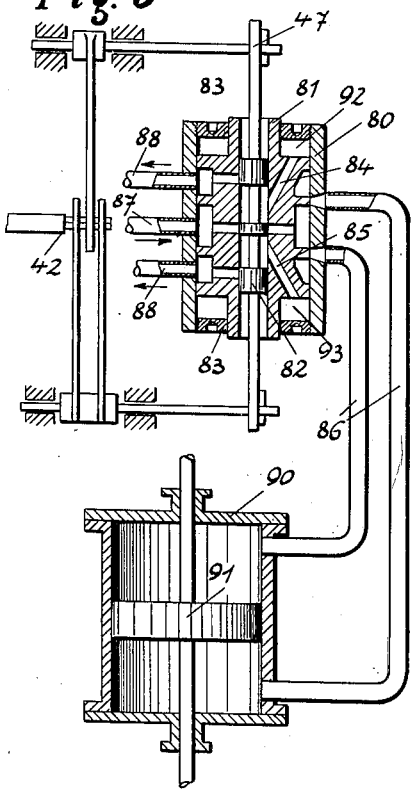
Figure 3 is a diagrammatic view partially in section of a motor and governor mechanism for varying physical or chemical quantities of large power or energy.

Figure 3 illustrates a motor and governor mechanism for controlling or varying physical or chemical quantities of large power or energy by a comparatively small variable fluid condition. The governor mechanism comprises a pilot valve 82, corresponding to the valve 48 in Figure 1, mounted in a relay governor piston 81 which is in turn slidably mounted in a cylinder 80 and serves as the piston of a pilot motor for actuating the relay governor. The pilot governor valve 82 is actuated from the member 42 in a manner similar to that shown in Figure 1 and controls the flow of fluid from a supply pipe 87 to chambers 92 and 93 at opposite ends of the cylinder 80. The chambers are formed between the ends of the piston 81 and removable caps 83. The relay governor piston 81 controls the flow of fluid from said supply pipe 87 through pipes 86 and 88 to and from a main fluid motor comprising the cylinder 90 and piston 91.

When the pilot governor valve 82 is moved in one direction or the other, fluid is admitted from pipe 87 to one or the other of chambers 92 or 93, and from the other. The relay governor piston 81 is thus moved in one direction and admits fluid from the supply pipe 87 through one of the pipes 86 to one side of the piston 91 of the main motor and from the other side of said piston through the other pipe 86 and one of the exhaust pipes 88. The main motor 90, 91 corresponds to the motor 30, 31, shown in Figure 1 of the drawings, and is connected to suitable means for controlling the physical or chemical quantity or quality.

Figure 4:
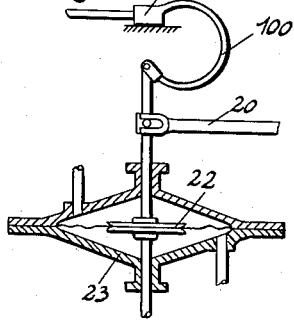
Figure 4 is a fragmentary diagrammatic view of a modified means adapted to be influenced by the variable fluid condition.
Figure 5:
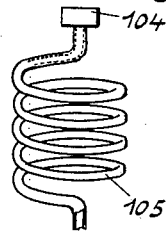
Figure 5 is a perspective view showing another such means.

In Figure 4 is shown a Bourdon tube 100 adapted to be used in place of the sensitive device 16, 17, shown in Figure 1, to respond to variations in the fluid condition. One end 101 of said tube is adapted to be connected to the pipe 8, and the other end thereof connected to the rod of the diaphragm 22. Variations in the fluid condition actuates the Bourdon tube in the usual manner to balance forces acting on the diaphragm 22 as does the device 16, 17 in Figure 1.

Figure 6:
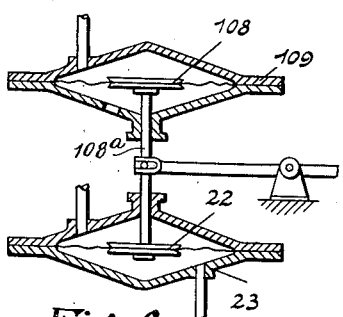
Figure 6 is a diagrammatic sectional view of another form of mechanism adapted to be influenced by the variable fluid condition.

If desired, a helical coiled tube 105 may also be utilized as the device sensitive to the fluid condition, one end 104 of said coil being connected to the pipe 8 and the other end being connected in any suitable manner to cooperate with the diaphragm 22. Figure 6 shows the use of a diaphragm 108 in a chamber 109 as the means sensitive to the variable fluid condition. One side of the diaphragm chamber is connected to the pipe 8 and the other side is open to the atmosphere. The diaphragm 108 is connected by a rod 108ª to the diaphragm 22.

Figure 7:
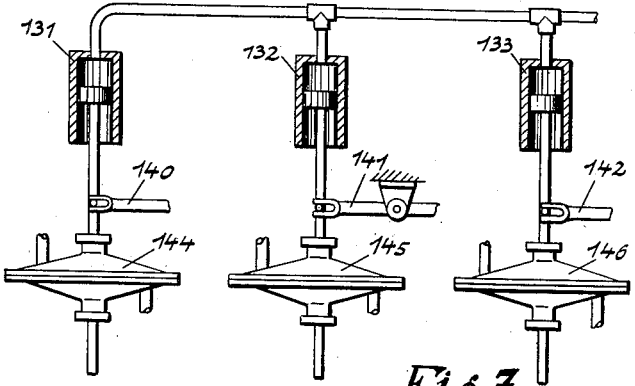
Figure 7 is a fragmentary diagrammatic view of mechanism for governing a plurality of physical or chemical quantities or qualities in accordance with one variable fluid condition.

A plurality of physical or chemical quantities or qualities may be varied or controlled in accordance with one fluid condition, and one possible apparatus for such a purpose is shown in Figure 7. A plurality of devices 131, 132 and 133 sensitive to the variable fluid condition may be provided, each of said devices comprising a cylinder and a piston similar to the cylinder and piston 16 and 17 of Figure 1, and the fluid condition may be conveyed to said sensitive devices in any suitable manner. The piston of each of said devices is connected to the diaphragm rod of one of a plurality of devices 144, 145 and 146 sensitive to variations in the physical or chemical quantities or qualities. These sensitive devices can be connected in any suitable manner to the remainder of the system such as shown in Figure 1, for instance by means of levers 140, 141 and 142 corresponding to the lever 20 in Figure 1.

Figure 8:
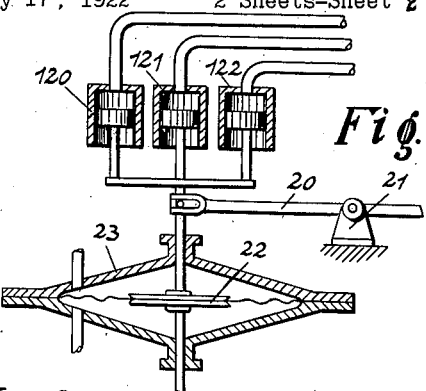
Figure 8 is a similar view showing mechanism for controlling one quantity or quality by a plurality of variable fluid conditions.

The invention also contemplates the varying or controlling of one quantity or quality in accordance with a plurality of variable fluid conditions, and one possible mechanism for such a purpose is shown in Figure 8. A plurality of devices 120, 121 and 122 similar to the devices 131, 132 and 133 are each connected in any suitable manner as by pipes 120ª, 121ª and 122ª to a variable fluid condition. The pistons in all of said devices 120, 121 and 122 are connected to the rod of the diaphragm sensitive to the physical or chemical quantity or quality, and the said diaphragm rod may be connected in any suitable manner, as by means of a lever similar to the lever 20 of Figure 1 to the remainder of the system. With this construction, the physical or chemical quantity or quality is varied or controlled in accordance with the sum or difference of the variable fluid conditions actuating the devices 120, 121 and 122.

It will be understood that the fluid condition may be automatically varied in any desirable manner for instance as disclosed in my copending application, Serial No. 575,745 or the fluid condition can be manually varied when desired. Also, while a fluid has been described as the physical or chemical quantity or quality, it will be understood that the system is capable of use for any physical or chemical quantity or quality, and that the valve or throttle 27 is only illustrative broadly of means for varying the quantity or quality.

It will be also understood that the mechanisms shown on the drawings are only for the purpose of illustrating the principles of the invention, and that the details of construction of the mechanisms can be modified or changed by those skilled in the art without departing from the spirit or scope of the invention. Therefore, I do not desire to be understood as restricting myself except as required by the following claims when construed in the light of the prior art.

Having thus described the invention, what I claim is:

1. A system of the class described for controlling a condition in accordance with another condition, comprising a device sensitive to variations in the second-mentioned condition and to variations in a variable auxiliary fluid condition so that said conditions balance each other, governing means actuated by said device upon departures from balance of said second-mentioned and said variable fluid conditions to vary said variable fluid condition in accordance with variations in said second-mentioned condition and restore said balance, a second device sensitive to said variable auxiliary fluid condition and to the condition to be controlled so that said variable fluid condition and said condition to be controlled balance each other, governor mechanism for auxiliary energy actuated by said second device upon departures from balance therein for varying said condition to be controlled, whereby said condition is controlled in accordance with variations in said fluid condition, and connecting means for transmitting said variable fluid condition from the first-mentioned device to the second-mentioned device.

2. A system of the class described for controlling a condition in accordance with another condition, comprising a device sensitive to variations in the second-mentioned condition, a second device sensitive to variations in a variable auxiliary fluid condition, said two devices being connected so as to balance each other, governing means for varying said variable fluid condition, means controlled by cooperation of said first two-mentioned devices upon departures from balance thereof to actuate said governing means to vary said variable fluid condition in accordance with variations in the second-mentioned condition and restore said balance, a third device responsive to variations in said variable auxiliary fluid condition, a fourth device sensitive to variations in the condition to be controlled, said third and fourth devices being connected so as to balance each other, governor mechanism for varying said condition to be controlled, means controlled by cooperation of said third and said fourth devices upon departures from balance thereof to actuate said governor mechanism to vary said condition to be controlled in accordance with variations in said auxiliary fluid condition and restore balance of said third and fourth devices, and connecting means for conducting said fluid condition between said second device and said third device.

3. A system of the class described for controlling a condition in accordance with another condition, comprising a device sensitive to variations in the second-mentioned condition and to variations in variable fluid pressure so that said condition and said fluid pressure balance each other, a source of fluid under pressure, a governing valve between said source and said device actuated by said device upon departures from balance therein to vary the supply of fluid to said device in accordance with variations in said condition and restore said balance, a second device responsive to said variable fluid pressure and to the condition to be controlled so that said fluid pressure and said condition to be controlled balance each other, governor mechanism for auxiliary energy actuated by said second device upon departures from balance therein to vary said condition to be controlled in accordance with variations in said fluid pressure, and connecting means for conducting fluid pressure between the first-mentioned device and the second-mentioned device.

4. A system of the class described for controlling a condition in accordance with another condition, comprising a device sensitive to variations in the second-mentioned condition, a second device sensitive to variations in variable fluid pressure, said two devices being connected so as to balance each other, a source of fluid under pressure, a governing valve between said source and said second device for varying the supply of fluid to said second device, means controlled by cooperation of said two devices upon departures from balance thereof to actuate said governing valve to vary the supply of fluid in accordance with variations in said condition and restore said balance, a third device responsive to said variable fluid pressure, a fourth device sensitive to variations in the condition to be controlled, said third and fourth devices being connected so as to balance each other, governor mechanism for varying said condition to be controlled, means controlled by cooperation of said third and said fourth devices upon departures from balance thereof to actuate said governor mechanism to vary said condition to be controlled in accordance with variations in said auxiliary fluid pressure and restore balance of said third and fourth devices, and connecting means for conducting said fluid pressure between said second device and said third device.

5. A system of the class described for varying or controlling a condition in accordance with a variable fluid condition, comprising means sensitive to variations in the fluid condition and to variations in the condition to be controlled so that said conditions balance each other, a member movable by cooperation of said variable fluid condition and said condition to be controlled in said sensitive means upon departures from balance therein, means for varying said condition to be controlled, and a means periodically actuated by auxiliary power to cooperate with said movable member to actuate said means for varying said condition to be controlled.

6. A system of the class described for varying or controlling a condition in accordance with a variable fluid condition, comprising means sensitive to variations in the fluid condition and to variations in the condition to be controlled so that said conditions balance each other, a member movable by cooperation of said variable fluid condition and said condition to be controlled in said sensitive means upon departures from balance therein, means for varying said condition to be controlled, and a means periodically actuated by auxiliary power to cooperate with said movable member to actuate said means for varying said condition to be controlled, whereby the speed of variation of said condition is a function of the departure of said movable member from its zero position.

7. A system of the class described for varying or controlling a condition in accordance with another condition, comprising an automatic device for transmitting variations in said second-mentioned condition to an auxiliary fluid condition, means sensitive to variations in said fluid condition and to variations in the condition to be controlled so that said fluid condition and said condition to be controlled balance each other, a member movable by cooperation of said variable auxiliary fluid condition and said condition to be controlled in said sensitive means upon departures from balance therein, means for varying said condition to be controlled, and means periodically actuated by auxiliary power to cooperate with said movable member for actuating said means for varying said condition to be controlled.

8. A system of the class described for varying or controlling a condition in accordance with another condition, comprising an automatic device for transmitting variations in said second-mentioned condition to a variable auxiliary fluid condition, means sensitive to variations in said fluid condition and to variations in the condition to be controlled so that said fluid condition and said condition to be controlled balance each other, a member movable by cooperation of said variable auxiliary fluid condition and said condition to be controlled in said sensitive means upon departures from balance therein, means for varying said condition to be controlled, and means periodically actuated by auxiliary power to cooperate with said movable member for actuating said means for varying said condition to be controlled so that the speed of variation of said condition is a function of the departure of said movable member from its zero position.

9. A system of the class described for varying or controlling a plurality of conditions in accordance with a variable fluid condition, comprising means for varying said fluid condition, a plurality of means sensitive to variations in said fluid condition and to variations in the conditions to be controlled so that said fluid condition balances said conditions to be controlled, and a plurality of means controlled by cooperation of said fluid condition and said conditions to be controlled in said plurality of sensitive means upon departures from balance therein for varying said conditions to be controlled.

10. A system of the class described for varying or controlling a plurality of conditions in accordance with another condition, comprising a device for automatically transmitting variations in said second-mentioned condition to a variable fluid condition, a plurality of means sensitive to variations in said fluid condition and to variations in the conditions to be varied so that said fluid condition balances said conditions to be controlled, and a plurality of means controlled by cooperation of said fluid condition and said conditions to be controlled in said plurality of sensitive means upon departures from balance therein for varying said conditions to be controlled.

11. A system of the class described for varying or controlling a condition in accordance with a plurality of variable fluid conditions, comprising a plurality of means for varying said fluid conditions, means sensitive to variations in said fluid conditions and to variations in said condition to be controlled so that said fluid conditions balance said condition to be controlled, and means controlled by cooperation of said fluid conditions and said conditions to be controlled in said sensitive means upon departures from balance therein for varying said conditions to be controlled.

12. A system of the class described for varying or controlling a condition in accordance with a plurality of other conditions, comprising a plurality of devices for transmitting variations in said second-mentioned conditions to a plurality of fluid conditions, a plurality of means for varying said fluid conditions, means sensitive to variations in said fluid conditions and to variations in the condition to be controlled so that said fluid conditions balance said condition to be controlled, and means controlled by cooperation of said fluid conditions and said condition to be controlled in said sensitive means upon departures from balance therein for varying said condition to be controlled.

13. A system of the class described for varying or controlling a condition in accordance with a variable fluid condition, comprising means sensitive to variations in the fluid condition and to variations in the condition to be controlled so that said conditions balance each other, a member movable by cooperation of said variable fluid condition and said condition to be controlled in said sensitive means upon departures from balance therein, means for varying said condition to be controlled, means periodically actuated by auxiliary power to cooperate with said movable member to actuate said means for varying said condition to be controlled, and yielding means connecting said movable member and said means for varying the condition to prevent overthrowing or hunting in the system.

14. A system of the class described for controlling a condition in accordance with another condition, comprising a device sensitive to variations in the second-mentioned condition and to variations in a variable auxiliary fluid condition so that said conditions balance each other, governing means actuated by said device upon departures from balance of said second-mentioned and said variable fluid conditions to vary said variable fluid condition in accordance with variations in said second-mentioned condition and restore said balance, a second device sensitive to said variable auxiliary fluid condition and to the condition to be controlled so that said variable fluid condition and said condition to be controlled balance each other, governor mechanism for auxiliary energy actuated by said second device upon departures from balance therein for varying said condition to be controlled, whereby said condition is controlled in accordance with variations in said fluid condition, connecting means for transmitting said variable fluid condition from the first-mentioned device to the second-mentioned device, and yielding means connecting said second device and said governor mechanism to prevent overthrowing or hunting in the system.

15. A system of the class described for controlling a condition in accordance with another condition, comprising a device sensitive to variations in the second-mentioned condition, a second device sensitive to variations in a variable auxiliary fluid condition, said two devices being connected so as to balance each other, governing means for varying said variable fluid condition, means controlled by cooperation of said first-two-mentioned devices upon departures from balance thereof to actuate said governing means to vary said variable fluid condition in accordance with variations in the second-mentioned condition and restore said balance, a third device responsive to variations in said variable auxiliary fluid condition, a fourth device sensitive to variations in the condition to be controlled, said third and fourth devices being connected so as to balance each other, governor mechanism for varying said condition to be controlled, means controlled by cooperation of said third and said fourth devices upon departures from balance thereof to actuate said governor mechanism to vary said condition to be controlled in accordance with variations in said auxiliary fluid condition and restore balance of said third and fourth devices, connecting means for conducting said fluid condition between said second device and said third device, and yielding means connecting said means controlled by cooperation of said third and fourth devices and said governor mechanism to prevent overthrowing or hunting in the system.

16. A system of the class described for controlling a condition in accordance with another condition, comprising a device sensitive to variations in the second-mentioned condition, a second device sensitive to variations in a variable auxiliary fluid condition, said two devices being connected so as to balance each other, governing means for varying said variable fluid condition, means controlled by cooperation of said first two-mentioned devices upon departures from balance thereof to actuate said governing means to vary said variable fluid condition in accordance with variations in the second-mentioned condition and restore said balance, a third device responsive to variations in said variable auxiliary fluid condition, a fourth device sensitive to variations in the condition to be controlled, said third and fourth devices being connected so as to balance each other, a member movable by cooperation of said third and fourth devices upon and in accordance with departures from balance thereof, means actuated by auxiliary energy for varying the condition to be controlled, and governor mechanism for said last-mentioned means controlled by said movable member to vary said condition to be controlled in accordance with variations in said fluid condition.

17. A system of the class described for controlling a condition in accordance with another condition, comprising a device sensitive to variations in the second-mentioned condition, a second device sensitive to variations in a variable auxiliary fluid condition, said two devices being connected so as to balance each other, governing means for varying said variable fluid condition, means controlled by cooperation of said first two-mentioned devices upon departures from balance thereof to actuate said governing means to vary said variable fluid condition in accordance with variations in the second-mentioned condition and restore said balance, a third device responsive to variations in said variable auxiliary fluid condition, a fourth device sensitive to variations in the condition to be controlled, said third and fourth devices being connected so as to balance each other, a member movable by cooperation of said third and fourth devices upon and in accordance with departures from balance thereof, means actuated by auxiliary energy for varying the condition to be controlled, governor mechanism for said last-mentioned means, and means actuated by auxiliary energy to periodically cooperate with said movable member and said governor mechanism to actuate the governor mechanism to vary said condition to be controlled in accordance with variations in said fluid condition.

18. A system of the class described for controlling a condition in accordance with another condition, comprising a device sensitive to variations in the second-mentioned condition, a second device sensitive to variations in a variable auxiliary fluid condition, said two devices being connected so as to balance each other, governing means for varying said variable fluid condition, means controlled by cooperation of said first two-mentioned devices upon departures from balance thereof to actuate said governing means to vary said variable fluid condition in accordance with variations in the second-mentioned condition and restore said balance, a third device responsive to variations in said variable auxiliary fluid condition, a fourth device sensitive to variations in the condition to be controlled, a yieldable connection between said third device and said fourth device to permit relative movement of said devices so that they may balance each other, governor mechanism for varying said condition to be controlled, means controlled by cooperation of said third and said fourth devices upon departures from balance thereof to actuate said governor mechanism to vary said condition to be controlled in accordance with variations in said auxiliary fluid condition and restore balance of said third and fourth devices, and connecting means for conducting said fluid condition between said second device and said third device.

ERICH ROUČKA.